US009495825B2

(12) United States Patent
Azuma et al.

(10) Patent No.: US 9,495,825 B2
(45) Date of Patent: Nov. 15, 2016

(54) GAME SYSTEM AND GAME CONTROL METHOD

(71) Applicant: Konami Digital Entertainment Co., Ltd., Minato-ku, Tokyo (JP)

(72) Inventors: Shogo Azuma, Minato-ku (JP); Ryohei Tatsumi, Minato-ku (JP); Norihiko Hara, Minato-ku (JP); Junichi Yamaguchi, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 316 days.

(21) Appl. No.: 14/041,228

(22) Filed: Sep. 30, 2013

(65) Prior Publication Data

US 2014/0228109 A1 Aug. 14, 2014

(30) Foreign Application Priority Data

Feb. 14, 2013 (JP) ................................ 2013-026770

(51) Int. Cl.
*A63F 13/73* (2014.01)
*G07F 17/32* (2006.01)

(52) U.S. Cl.
CPC ................................ *G07F 17/3202* (2013.01)

(58) Field of Classification Search
CPC ................ A63F 13/23; A63F 13/323; A63F 2300/403; G07F 17/32; G07F 17/3202; G07F 17/3204
USPC ................................................... 463/29, 42
See application file for complete search history.

(56) References Cited

U.S. PATENT DOCUMENTS

2006/0199648 A1* 9/2006 Mitchell ................ G07F 17/32 463/46
2008/0287182 A1 11/2008 Aida
2010/0304819 A1 12/2010 Stockdale et al.
2010/0311490 A1* 12/2010 Miller ....................... A63F 1/18 463/16
2013/0053129 A1* 2/2013 LeMay .............. G07F 17/3223 463/25

FOREIGN PATENT DOCUMENTS

JP 2013-016889 A 1/2013
WO 2009/015347 A1 1/2009

OTHER PUBLICATIONS

Patent Examination Report No. 1 (AU 2013237649); Date of Issue: Feb. 9, 2015.

* cited by examiner

*Primary Examiner* — Allen Chan
(74) *Attorney, Agent, or Firm* — Howard & Howard Attorneys PLLC

(57) ABSTRACT

A game system is provided that can control power-feeding of a power-feeding device according to playing of a game. In a game system that executes an arcade game and that is provided with a power-feeding device that feeds a personal terminal device, it is determined whether or not the arcade game is being executed, and the power-feeding function of the power-feeding device is controlled on the basis of the result of that determination.

4 Claims, 7 Drawing Sheets

GAME SYSTEM AND GAME CONTROL METHOD

CROSS-REFERENCE TO RELATED APPLICATION

This application claims priority to Japanese Patent Application No. 2013-026770, filed Feb. 14, 2013, the disclosure of which is hereby incorporated by reference in its entirety.

TECHNICAL FIELD

The present invention relates to a game system or the like that is equipped with an electrical power supply function.

BACKGROUND ART

A game system that provides a service in which a terminal device for an individual person that can connect to a network, such as the mobile telephone network or the like, and a game machine for commercial use work together in cooperation is per se known (for example, refer to Patent Document #1).

Patent Document #1: Japanese Laid-Open Patent Publication 2013-16889.

SUMMARY OF THE INVENTION

Technical Problem

Sometimes it may happen that the user utilizes the personal terminal device while playing upon the game machine. When the service of cooperation with the game machine is being supplied by the personal terminal device, then utilization of the personal terminal device while the user playing upon the game machine becomes high as well as does utilization of the game machine, but in this situation there is a fear that the utilization of the personal terminal device may be hindered due to depletion of its battery. On the other hand, if simply a power-feeding device is provided, then there is a fear that a user who is not employing the game machine will take advantage of only the power-feeding device.

Therefore, the present invention aims to provide a game system etc. that is capable of controlling power-feeding of a power-feeding device in correlation with playing of a game.

Solution to Technical Problem

The game system of the present invention is a game system that comprises a game execution device that executes a first game and a power-feeding device that feeds a device that is connected thereto, comprising: a first game execution determination device that determines whether or not the first game is being executed; and a power-feeding control device that controls a power-feeding function of the power-feeding device on a basis of the result of determination by the first game execution determination device.

The game control method of the present invention is a game control method for a game system that comprises a power-feeding device that feeds a device that is connected thereto, comprising: a game execution step of executing a first game; a first game execution determination step of determining whether or not the first game is being executed; and a power-feeding control step of controlling a power-feeding function of the power-feeding device on the basis of a result of determination by the first game execution determination step.

According to the present invention, power-feeding is controlled according as to whether or not the user is playing the first game. Due to this, it is possible to prevent utilization only of the power-feeding facility, and thus it is possible to provide an appropriate service to the user.

In one embodiment of the game system of the present invention, the game execution device charges a playing fee to a user and permits the user to play the first game; and the game execution determination device determines whether or not the first game is being executed on the basis of payment of the playing fee. According to this, the user pays a playing fee in order to pay the first game, and it is possible to permit power-feeding as an additional compensation for that payment.

In another embodiment of the game system of the present invention, the power-feeding control device performs control so as to limit a time period of power-feeding by the power-feeding device, on the basis of the result of determination by the first game execution determination device. According to this, it is possible to provide many different services by limiting the time interval during which power-feeding is allowed.

In yet another embodiment of the game system of the present invention, the connected device is a personal terminal device for an individual person. According to this, it becomes possible to perform power-feeding of a personal terminal device that is possessed by the user. As examples of such personal terminal devices, various types of computer devices that provide personal applications and that can be connected to a network may be cited, such as a mobile telephone (including a smartphone), a portable tablet type terminal device, a portable laptop type PC, and a portable type game machine and so on.

With regard to the embodiment of power-feeding the personal terminal device, the game system further comprising a power-feeding condition determination device that determines whether or not a predetermined power-feeding condition is satisfied by the personal terminal device, and wherein the power-feeding control device feeds the personal terminal device when the first game is being executed, and moreover when the personal terminal device satisfies the predetermined power-feeding condition. According to this, by also providing this power-feeding condition for the personal terminal device that needs to be fed as well, it is possible to provide an appropriate service by also imposing a condition upon the personal terminal device that is the subject for being fed.

In this embodiment, a game machine to which the power-feeding device is provided and the personal terminal device are connected together via a network, and the game machine is capable of providing a service to a user of the personal terminal device of playing a second game upon the personal terminal device; and the fact that the second game is being executed is set as the power-feeding condition. Thus, power-feeding of the personal terminal device is permitted if, while the user is playing the first game, he/she is also playing the second game upon the personal terminal device. Due to this, it is possible to encourage a user who is playing the first game, also to play the second game without worrying that the battery in his/her portable terminal device may run down. Since power-feeding is not permitted to a user who is not playing the first game, accordingly it is possible to supply a better service by appropriately restricting the subjects that can be fed.

Advantageous Effects of Invention

As has been explained above, with the present invention, the power-feeding of the personal terminal device is controlled according to whether or not the user is playing the first game. Due to this, it is possible to prevent a user taking unfair advantage of only the power-feeding facility, so that it is possible to provide an appropriate service to the user.

DESCRIPTION OF EMBODIMENTS

Figure 1:
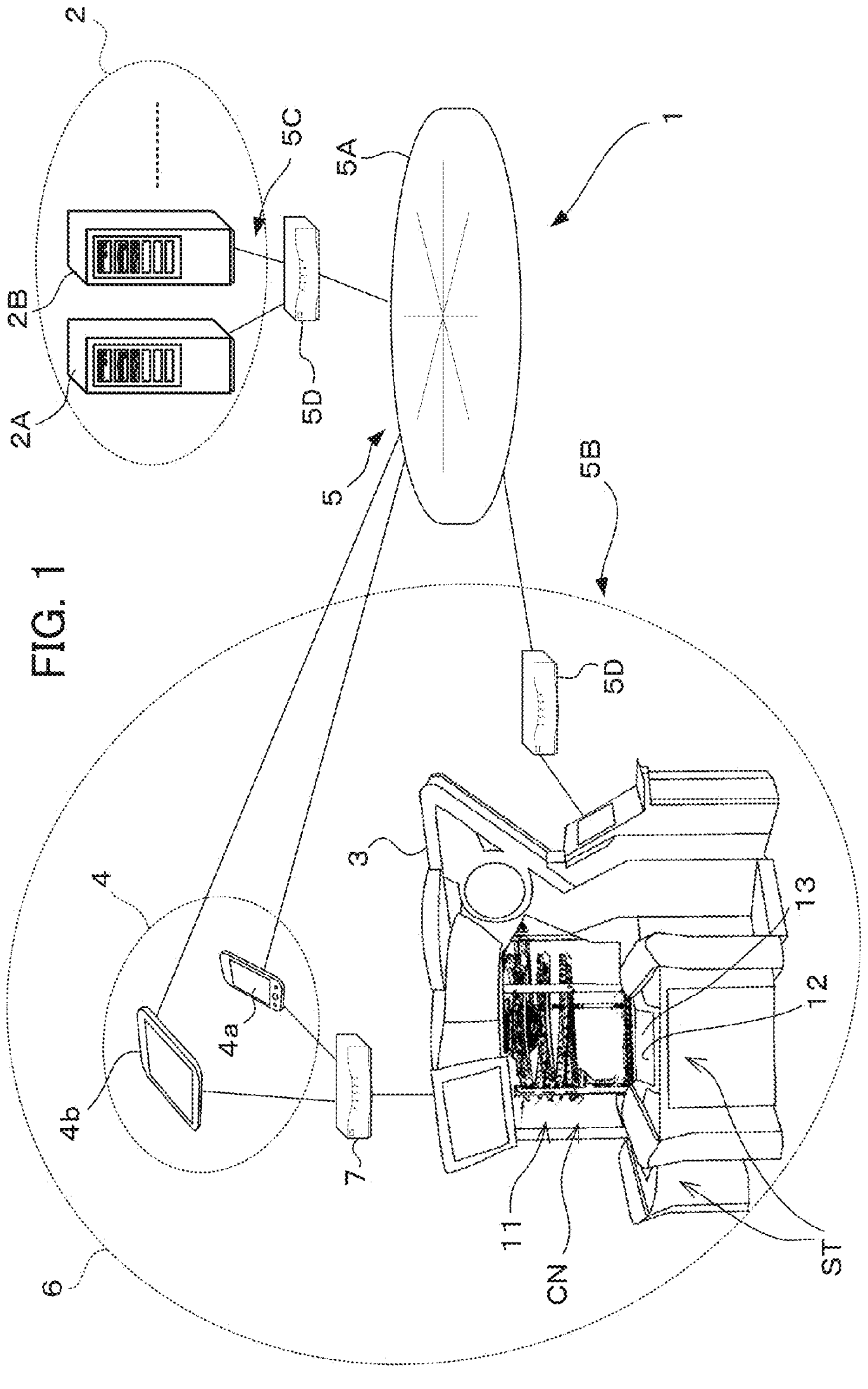
FIG. 1 is a figure showing the overall structure of a game system according to an embodiment of the present invention.

FIG. 1 is a figure showing the overall structure of a game system according to an embodiment of the present invention. This game system 1 includes a center server 2, a game machine 3, and a personal terminal device 4. The center server 2 is built as a logical server device by combining a plurality of server units 2A, 2B, . . . . However, it would also be acceptable to build the center server 2 from a single server unit. Or it would also be possible to build the center server 2 as a logical device by employing cloud computing.

The game machine 3 is constructed as a game machine for commercial use (i.e. for business use) that charges a predetermined playing fee and then permits a user to play. This type of game machine 3 is sometimes termed an "arcade game machine". The game machine 3 is a game apparatus that is controlled by a computer and that is installed in a predetermined facility such as a shop 6 or the like, with the main objective of earning by enticing a large number of users to play the game repeatedly. It should be understood that an appropriate number of game machines 3, either one or more, are installed in the shop 6. While only one such game machine 3 is shown in FIG. 1, any appropriate number of game machines of various types may be installed. The hardware structure of the game machines that are installed, and the details of the games that they provide, may be selected as appropriate. While this game machine 3 is built as a dedicated machine having a physical structure that matches some specific game, it would also be possible for it to be built as a general purpose machine that can provide various types of game when its software is rewritten.

The applicable personal terminal devices 4 include a mobile telephone 4*a* (which can be a smartphone) and a portable type tablet terminal device 4*b*. Apart from the above, computer devices of various types that support applications aimed at individuals and that can be connected to a network, such as a portable laptop type PC or a portable type game machine and so on, are included within the possible terminal devices 4. It is possible for various services supplied by the center server 2 to be provided to the user by computer software of various kinds being implemented upon the personal terminal devices 4.

The network 5 is not limited in any particular way, provided that it is one that can connect the game machine 3 and the personal terminal devices 4 to the center server 2; a network of any appropriate structure may be employed. As one example, the network 5 may be configured to implement network communication by using the TCP/IP protocol. Typically, the network 5 may be constructed by connecting together the internet 5A (which serves as a WAN) and LANs 5B and 5C to which the center server 2 and the game machine 3 are respectively connected, via routers 5D. The personal terminal devices 4 are also connected to the internet 5A by appropriate structures. It should be understood that it would also be possible to install a local server between the game machine 3 and the router 5D of the shop 6, so that the game machine 3 and the center server 2 are connected together via this local server so as to be capable of mutual communication. The server units 2A, 2B, . . . of the center server 2 may sometimes also be mutually connected together via the WAN 5A, instead of, or as well as, by the LAN 5C being employed.

The game machine 3 and the personal terminal devices 4 are built so as to be capable of mutual communication with one another via a wireless LAN router 7. By each of the personal terminal devices 4 operating together with the game machine 3 via the wireless LAN router 7, a mobile game can be supplied on that terminal device 4 as a second game. The personal terminal device 4 of the user is registered upon the game machine 3, so that a slot game that works together with a lottery game executed by the game machine 3 can be provided to the personal terminal device 4. The wireless LAN router 7 could also be provided internally to the game machine 3. It should be understood that it would also be acceptable to arrange for the personal terminal device 4 to be registered upon the center server 2. Any per se known structure that is appropriate may be employed, provided that it is compatible with the game machine 3 and with the personal terminal device 4.

The structure of the game machine 3 will now be explained with reference to FIG. 3. This game machine 3 is a so called medal game machine that utilizes medals as a game medium. The game machine 3 is provided with a center unit CN and a plurality of station units ST that are positioned so as to surround the periphery of this center unit CN. The center unit CN is provided with a physical lottery mechanism 11 that randomly chooses an option by injecting a ball onto a roulette wheel upon which a plurality of options are provided, and thereby executes a lottery game. Each of the station units ST can execute games of a plurality of types by utilizing this lottery mechanism 11. Each of the station units ST is provided with a medal insertion slot (not shown in the figures), a display device 12, and a transparent touch panel 13 that is laid over the display device 12. A game screen 100 (see FIG. 2) is displayed upon the display device 12, and a game progresses according to actuation by the user upon the touch panel 13. While one example of such a display device 12 is a liquid crystal display device, any of various types of per se known display device may be employed. One or two people can play upon each of the station units ST. When two people are playing, they both view the same display device 12 while actuating the touch panel by touch operation.

Games of a plurality of types are supplied by the game machine 3, and progress according to the options that are repeatedly chosen at random by the lottery mechanism 11 of the center unit CN. It should be understood that, in some cases, the games that can be played by the game machine 3 will be referred to as "arcade games", and these are examples of a first game. The lottery mechanism 11 can randomly choose one number from a plurality of possible options, which in this case are the numbers 1 through 25. On the other hand, in the games that can be played on the station units ST, the progression of the games changes by changing of blocks or panels that are linked to the numbers thus chosen at random. For example, a plurality of games such as a block deletion game or a bingo game or the like may be provided by the station units ST. The user selects a plurality of games that he/she desires to play, and is able to play the games that he/she has selected in parallel while the chance game is being executed. As one example, games of five types may be provided by the station units ST, and the user is able to select three of those games and play them in parallel. The user bets one or more medals in each game, and prizes of various sorts, such as allotments of medals or items or the like, are awarded according to the results of the games. Explanation of the rules of the various games will here be omitted. Per se known games may be provided.

Figure 2:
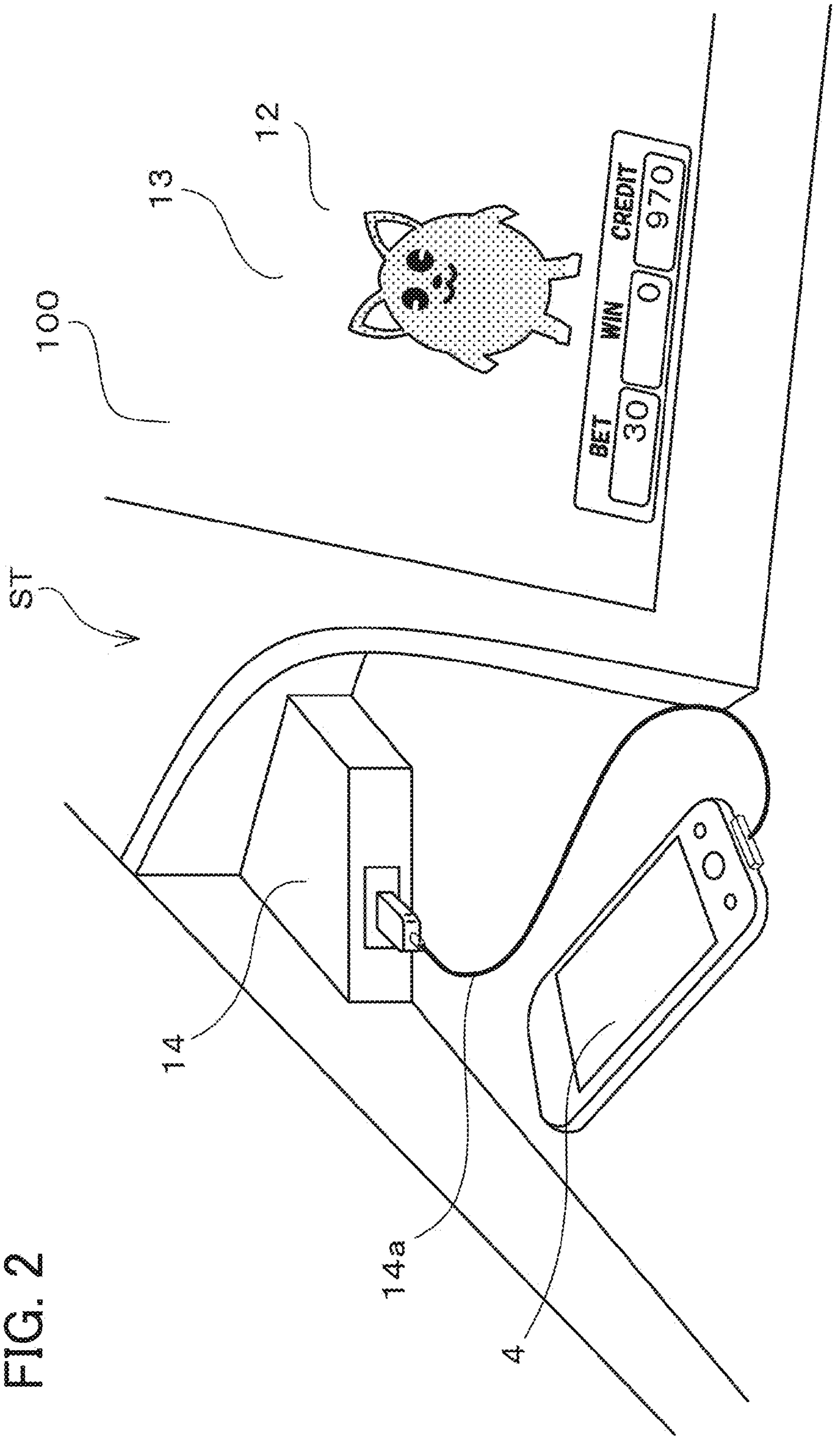
FIG. 2 is an enlarged view of principal portions of a station unit.

FIG. 2 is an enlarged view of principal portions of one of the station units ST. This station unit ST is provided with a USB port 14 that is proximate to its display device 12. Via a power-feeding cable 14*a*, the user is able to connect a personal terminal device 4 to the USB port 14 so as to feed it. However, according to the present invention, on this game machine 3, a power-feeding limitation is imposed during use of the USB port 14. This is in order to prevent unfair usage by a user who is not using the game machine 3. If the user prepares to play the arcade game by inserting medals into a medal insertion slot of the station unit ST, and moreover if the personal terminal device 4 satisfies some predetermined power-feeding condition, then this power-feeding limitation is removed, and the personal terminal device 4 that is connected is fed.

Here, in this embodiment, the fact that a mobile game provided from the game machine 3 to the personal terminal device 4 is being played is set as the power-feeding condition. A mobile game can be played by an application that is installed upon the personal terminal device 4 being executed. The progression of the mobile game upon the personal terminal device 4 is controlled by arcade game data 52 for the game that is in progress upon the game machine 3 being received from the game machine 3.

Figure 3:
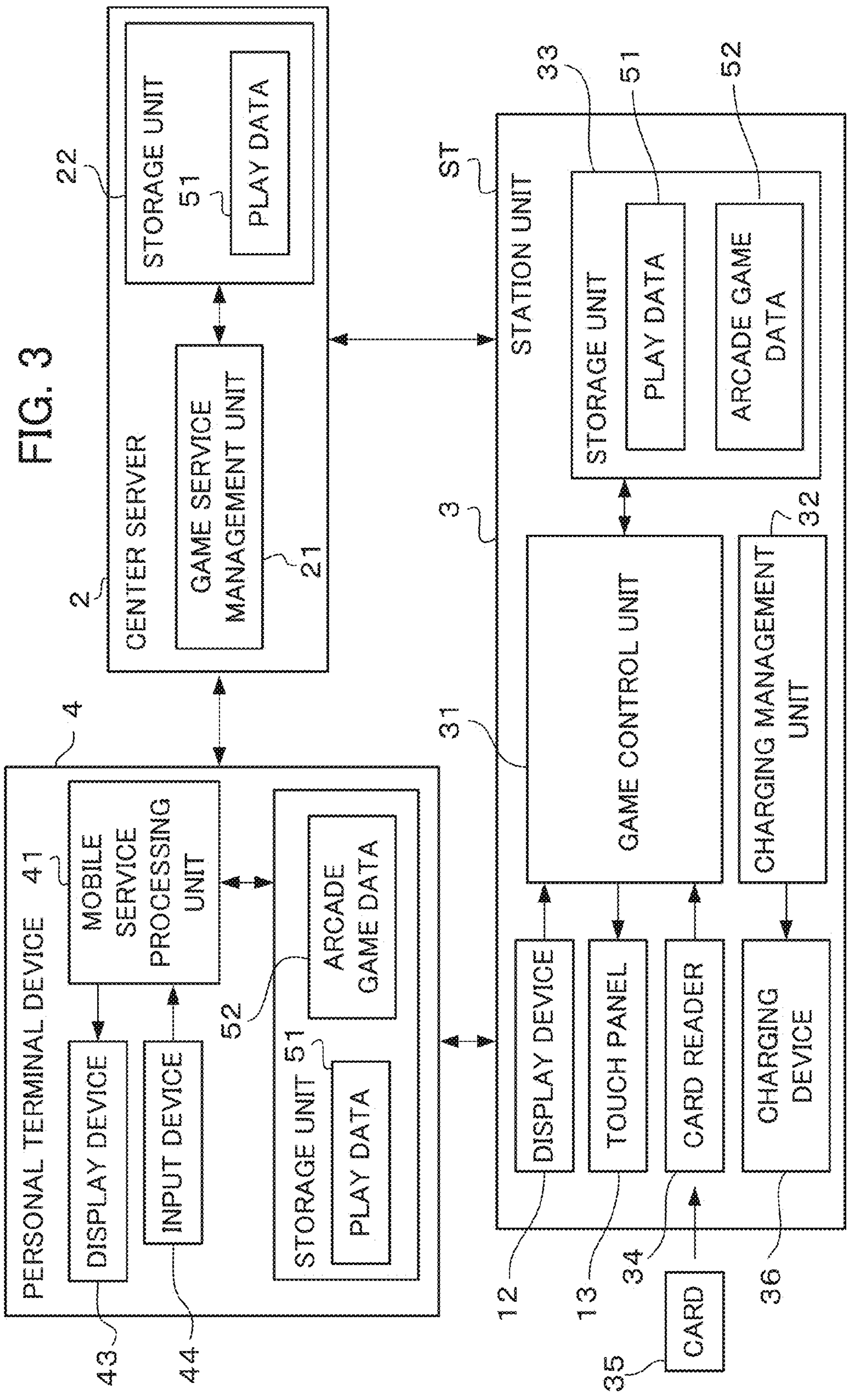
FIG. 3 is a functional block diagram for explanation of principal portions of a control system of a game system.

FIG. 3 is a functional block diagram for explanation of principal portions of the control system of this game system 1. A game service management unit 21 and a storage unit 22 are provided to the center server 2. The game service management unit 21 is a logical device that is implemented as a combination of computer hardware of the center server 2 (including a CPU and a memory that is an internal storage device necessary for its operation) and software. The storage unit 22 is an external storage device that is implemented as a storage unit such as a hard disk array or the like. This storage unit 22 could be built to store all its data within a single storage unit, or could be built to store its data dispersed over a plurality of storage units, in a distributed manner.

While data of various types is stored in the storage unit 22, one such type of data is play data 51, as shown in FIG. 3. This play data 51 is data that contains details of game play for the user to continue playing a game, and includes the data required for executing the mobile game and the arcade game. Such play data 51 is created for each user, and is stored in the storage unit 22 in correspondence with a user ID that is allocated to each user; but, in FIG. 3, only play data corresponding to the identification information for a single user is shown. The play data 51 in the storage unit 22 is managed with these player IDs. While, apart from these user IDs, each user has IDs that are utilized for services of various types, such as an intrinsic user ID that is attached to a card 35 that he/she possesses and so on, these are managed by being linked to the user ID. Apart from this, it would also be possible for account information for the user and his/her user ID to be linked together, so that it is possible to perform settlement using electronic cash.

The game service management unit 21 provides predetermined game services to the game machine 3 and to the personal terminal device 4. Examples of such game services, for example, are the service of authenticating users by receiving user authentication identification (for example, unique identification number and a password from each user) from the game machines 3, storing play data 51 received from the game machine 3 corresponding to those users in the storage unit 22, and supplying user play data 51 stored in the storage unit 22 to the game machines 3, a service of updating software for the game machines 3 (a program or data for playing) via the network 5, and so on. The same holds for the personal terminal device 4, instead of the game machine 3.

A game control unit 31, a power-feeding management unit 32, and a storage unit 33 are provided to each of the station units ST of the game machine 3. It should be understood that, while a control unit and a storage unit are also provided to the center unit CN of the game machine 3, these are omitted from FIG. 3. The game control unit 31 and the power-feeding management unit 32 are logical devices that are implemented on the game machine 3 as combinations of computer hardware and software. Processing related to control of the arcade game described above is executed by the game control unit 31. A power-feeding device 36 is connected to the power-feeding management unit 32, and this management unit manages whether or not power-feeding of a personal terminal device 4 that is connected to the USB port 14 is performed. The power-feeding device 36 is a per se known device that supplies electrical power to the USB port 14. The power-feeding management unit 32 manages the supply of electrical power to the USB port 14. And the storage unit 33 is an external storage device that is implemented as a storage unit such as a hard disk array or the like.

The display device 12, the touch panel 13, and a card reader 34 for reading in information upon the card 35 upon which user identification information is recorded and for outputting a signal corresponding to that information to the game control unit 31 are connected to the game control unit 31. A non-volatile storage medium such as an IC chip or a magnetic stripe is provided upon the card 35, and a unique ID for each card (sometimes termed the "card ID") and so on are recorded upon that medium. The card ID is used as information for the center server 2 to identify the user of the game machine 3. Playing data 51 that is recorded in the storage unit 22 of the center server 2 in correspondence to the card ID of the user is recorded in the storage unit 32 of the game machine 3. And arcade game data 52 in which is recorded data related to the results of random choice in the lottery game executed by the center unit CN is recorded in the storage unit 22. According to requirements, the game control unit 31 transmits this arcade game data 52 to the personal terminal device 4 that is currently registered.

A mobile service processing unit 41 and a storage unit 42 are provided to the personal terminal device 4. The mobile service processing unit 41 is a logical device that is implemented upon the personal terminal device 4 as a combination of computer hardware and software. Processing related to the mobile game described above is executed by the mobile service processing unit 41. And the storage unit 42 is an external storage device that is implemented as a storage unit such as a hard disk array or the like. A display device 43 and an input device 44 are connected to the mobile service processing unit 41. As one example, the input device 44 may be of a per se known type consisting of a touch panel that is provided to a smartphone. Or, instead of a touch panel, the input device 44 may consist of a plurality of buttons that are provided to a mobile telephone or the like. When the user actuates the input device 44 and performs input of his/her user ID, play data 51 that has been recorded in the storage unit 22 of the center server 2 is recorded in the storage unit 42 of the personal terminal device 4. Moreover, according to the progression of the game on the game machine 3, arcade game data 52 is transmitted from the game machine 3 to the storage unit 42, and is recorded therein.

Figure 4:
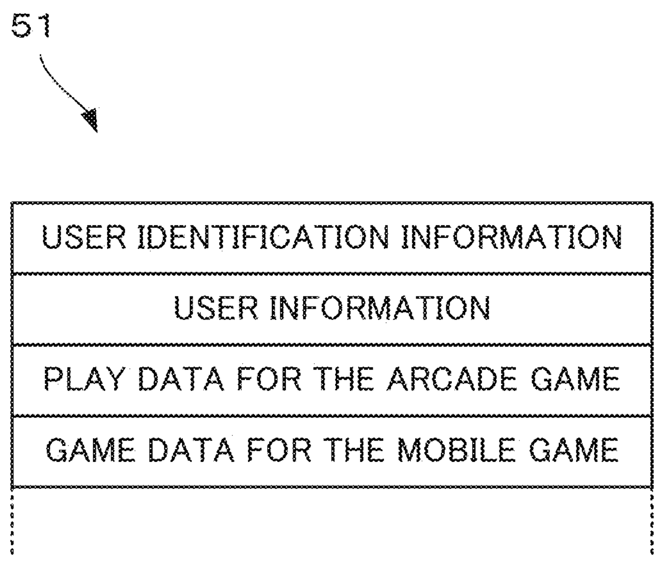
FIG. 4 is a figure showing an example of play data.

FIG. 4 is a figure showing an example of the play data 51. Information of various types such as user information, play data for the arcade game, and game data for the mobile game is recorded in the play data 51, in correspondence with user identification information (the user ID or the card ID or the like). The user information is information for specifying a nickname to be used by the user when playing the game, and so on. The arcade game data is log information in which data is recorded related to playing of the game, such as the dates and times that the user has played the arcade game upon the game machine 3, the number of times he/she has played, the periods of playing, the play modes, and so on. And the mobile game data is log information in which data is recorded related to playing of the mobile game on the personal terminal device 4 by the user.

Figure 5:
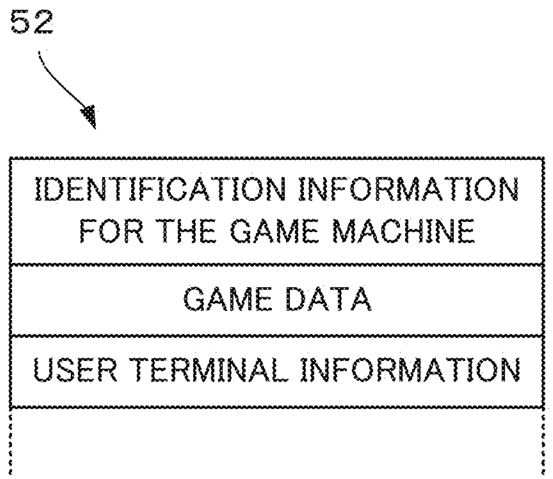
FIG. 5 is a figure showing an example of arcade game data.

FIG. 5 is a figure showing an example of the arcade game data 52. Information of various types, such as game data for results of random choice in the lottery game executed by the game machine 3 and user terminal information in which the user IDs of users of wireless LAN communication who are registered to the game machine 3, identification information required for communication with their personal terminal devices 4, and so on, are recorded, is recorded in this arcade game data 52 in correspondence with identification information for the game machine 3. When communication is performed with the game machine 3 via the wireless LAN router 7 by using the communication function of the personal terminal device 4, the user terminal information for the personal terminal device 4 that is communicating with the game machine 3 is recorded in the arcade game data 52.

Figure 6:
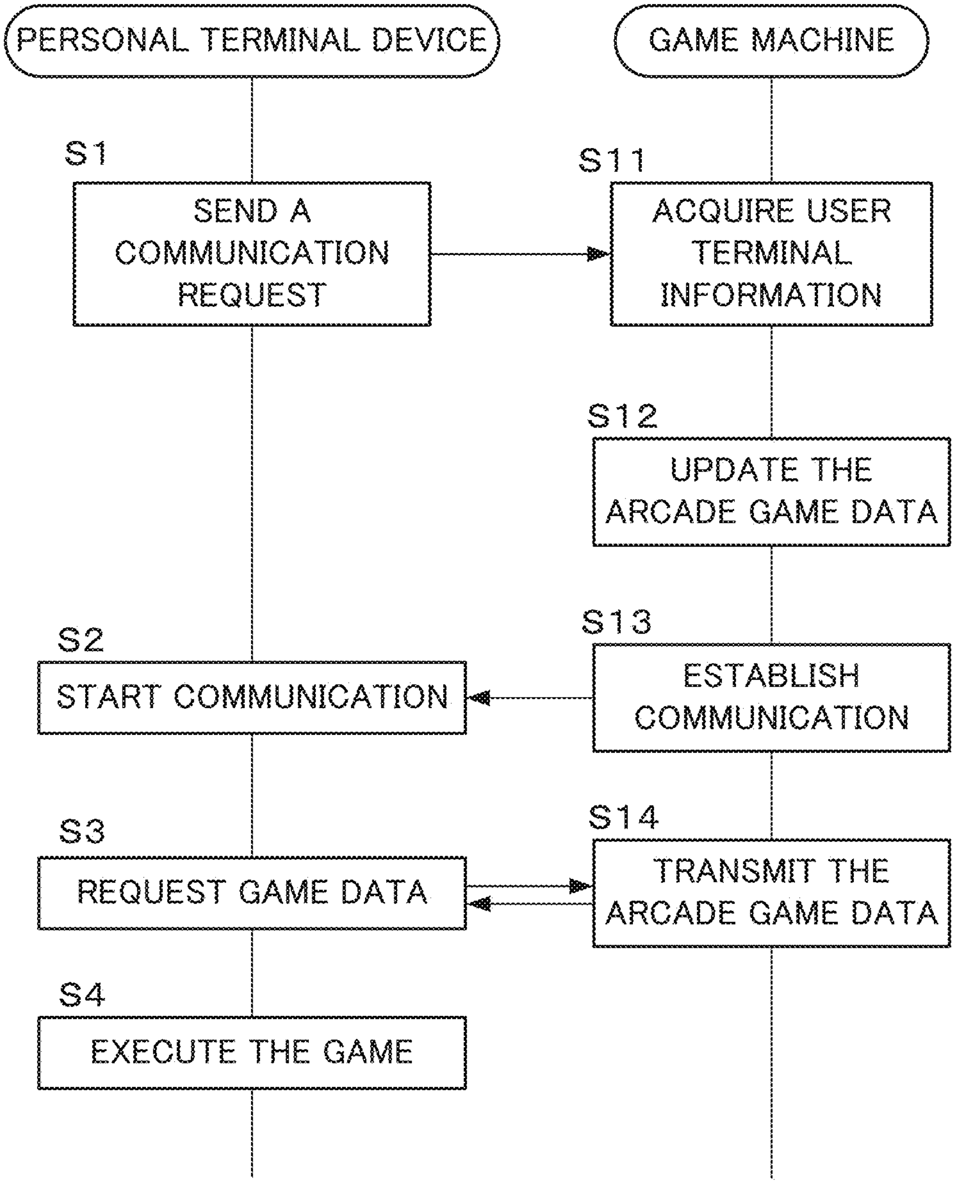
FIG. 6 is a flow chart showing mobile game service supply procedure that is executed by a game control unit of a game machine and by a mobile service processing unit of an personal terminal device in cooperation.

FIG. 6 is a flow chart showing mobile game service supply procedure that is executed by the game control unit 31 of the game machine 3 and by the mobile service processing unit 41 of the personal terminal device 4 in cooperation. This mobile game service supply procedure is processing for providing a network environment to the personal terminal device 4 via the wireless LAN router 7, and for supplying a mobile game service in this network environment.

When the mobile service processing unit 41 of the personal terminal device 4 sends a communication request to the game machine 3 (in the step S1), the game control unit 31 of the game machine 3 acquires user terminal information for the personal terminal device 4 that issued the communication request (in the step S11). When making this communication request, the mobile service processing unit 41 may transmit its own user terminal information. The game control unit 31 updates the arcade game data (in the step S12). And the game control unit 31 establishes communication with this personal terminal device 4 (in the step S13), and notifies the personal terminal device 4 of the fact that communication has started. The game control unit 31 may make the necessary settings for this establishment of communication by utilizing any appropriate per se known technique.

Via the wireless LAN router 7, the mobile service processing unit 41 of the personal terminal device 4 starts communication as established by the game control unit 31 (in the step S2). A per se known technique may be employed for this establishment of communication. When the user executes the application for the mobile game, the mobile services processing unit 41 requests game data needed for the progression of the mobile game from the game machine 3 (in the step S3), and the game control unit 31 of the game machine 3 extracts the necessary game data from the arcade game data 52 and transmits that data to the personal terminal device 4 (in the step S14). And execution of the game is continued by the mobile service processing unit 41 on the basis of this game data that it has acquired (in the step S4).

Figure 7:
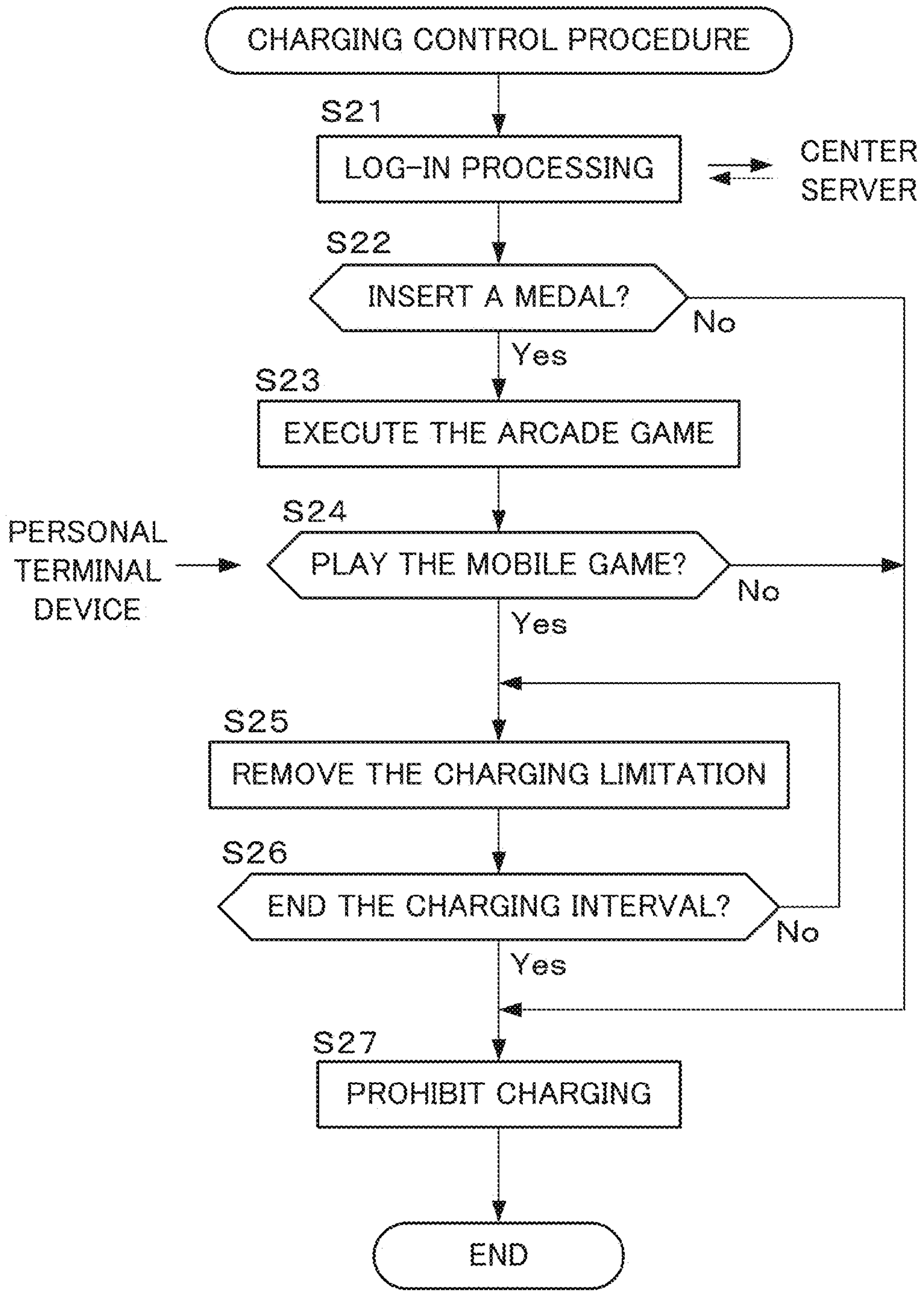
FIG. 7 is a flow chart showing a power-feeding control procedure that is executed by a game control unit of the game machine.

FIG. 7 is a flow chart showing a power-feeding control procedure that is executed by the game control unit 31 of the game machine 3. This power-feeding control procedure is processing that controls whether or not a user who is playing upon the station unit ST is permitted to perform power-feeding. First, the game control unit 31 performs log-in processing upon a request from the user (in the step S21). A per se known technique may be employed for this log-in processing. For example, the game control unit 31 may request the user to present the card 35, may read the card ID of the card 35 with the card reader 34, and may notify this card ID to the center server 2, thus making a log-in request. And, along with identifying the user ID on the basis of the notified card ID, the game service management unit 21 of the center server 2 extracts the playing data 15 that corresponds to this user ID (or to this card ID), and supplies it to the game machine 3.

The game control unit 31 of the game machine 3 determines whether or not a medal has been inserted (in the step S22). It will be acceptable to arrange for this insertion of a medal to be an actual direct insertion of a medal into the game machine 3; or it would also be possible for it to be implemented by a deduction of an amount of money corresponding to a number of medals that the user wishes to use from an account that is linked to the user ID. Such a method of settlement by electronic cash may employ any appropriate per se known technique. When a medal has been inserted, the game control unit 31 executes the arcade game (in the step S23). As the arcade game, the game control unit 31 may execute any of various types of game that depend upon the random choice result of the lottery game executed by the center unit CN, such as a bingo game or the like.

The game control unit 31 determines whether or not the user is playing the mobile game (in the step S24). For example, the game control unit 31 may determine that the user is playing the mobile game because of the arrival of a request for game data due to the step S3 of FIG. 6. The processing of the step S24 is considered to be the condition for performing power-feeding. If the user is playing the mobile game, then the power-feeding management unit 32 removes the power-feeding limitation of the power-feeding device 36 (in the step S25). Due to this, power-feeding of the personal terminal device 4 starts when the personal terminal device 4 is connected to the USB port 14. A predetermined power-feeding interval is set for the power-feeding of electrical power into the personal terminal device 4 to continue, and power-feeding is permitted during this interval. For example, as the power-feeding interval, the interval while the arcade game is being played by the game machine 3, or a predetermined time interval from when the power-feeding limitation has been removed, may be set. And the power-feeding management unit 32 determines whether or not the power-feeding interval has ended (in the step S26). If the power-feeding interval has not ended, then the power-feeding management unit 32 returns to the step S25, and accordingly power-feeding is permitted until the power-feeding interval has elapsed. On the other hand, if the power-feeding interval has ended, then the power-feeding management unit 32 prohibits further power-feeding (in the step S27), and this episode of processing terminates.

According to the processing described above, when the user plays the arcade game on the game machine 3 (in the steps S21 through S23), and plays the mobile game upon the personal terminal device 4, then, if the personal terminal device 4 satisfies the power-feeding condition (in the step S24), the power-feeding limitation of the station unit ST upon which the user is playing is removed (in the step S25), and power-feeding is permitted during the power-feeding interval (in the steps S26 and S27).

In the processing described above, the processing of the step S22 executed by the game control unit 31 of the game machine 3 corresponds to the first game execution determination device, the processing of the step S23 corresponds to the game execution device, and the processing of the step S24 corresponds to the power-feeding condition determination device. Moreover, the processing of the steps S25 through S27 executed by the power-feeding management unit 32 of the game machine 3 corresponds to the power-feeding control device.

The present invention is not to be considered as being limited to the embodiment described above; various other forms for its implementation may be adopted. For example while, in this embodiment, the explanation has been made in terms of the device which is to be fed being a personal terminal device 4, this is not necessarily limitative of the present invention. For example it would be possible, with the present invention, to feed any compact device that can be fed via USB, such as a table-top fan, a blanket, a cup warmer, or the like. It would be possible to perform power-feeding only during a predetermined power-feeding interval when the arcade game is being played, and it would also be possible not to perform power-feeding when the mobile game is not being played. It would be possible for the user to change the device that is connected according to his/her wishes, provided that it is compatible with the USB port 14, and it is possible to perform power-feeding of devices of various types. The utilization of power-feeding power may be left to the wishes of the user. Moreover, it would also be acceptable to arrange to vary the power-feeding interval according to the result of playing the arcade game or the mobile game.

While, in the embodiment described above, an example has been explained in which playing of the mobile game is set up as being the condition for power-feeding, this is not necessarily limitative of the present invention. For example, it would also be acceptable for the fact that the personal terminal device 4 has executed the processing of the step S1 of FIG. 6 and that establishment of communication with this personal terminal device 4 has been completed, to be set up as being the condition for power-feeding. By the personal terminal device 4 being present upon the network environment supplied by the game machine 3, it becomes possible for services of various types to be supplied from the game machine 3 to the personal terminal device 4. It is possible for one of these services to be enablement of the power-feeding function of the game machine 3. In order to perform power-feeding, it is necessary for the user to stay at the station unit ST of the game machine ST, and accordingly it would be possible to suggest to a user who is staying for power-feeding that he/she should play a game. Moreover, it is not necessary for any power-feeding condition at all to be enforced; it would also be acceptable, after the processing of the step S23, for the flow of control to proceed directly to the step S25 so that the power-feeding limitation is removed and power-feeding of any device that is connected starts.

While, in the embodiment described above, whether or not the first game is being executed is determined in the processing of the step S22 of FIG. 7 according to whether or not a token has been inserted, this is not necessarily limitative of the present invention. For example, it would also be acceptable to provide a condition that, in the first game, a predetermined stage has been cleared, a predetermined item has been acquired, or the like. It would also be acceptable to provide some condition of this type related to the playing of the first game, and to determine whether or not the first game is being executed by this condition being satisfied.

While, in the embodiment described above, the power-feeding control procedure was executed by the game machine 3, this is not necessarily limitative of the present invention. It could also be executed by the control unit of the center server 2 or by the control unit of the personal terminal device 4 (i.e., by the game service management unit 21 or by the mobile service processing unit 41). Via communication, control of the power-feeding device 36 could be performed by any computer unit included in the game system 1. Moreover, it would also be acceptable for the power-feeding device 36 to be provided separately from the game machine 3. Furthermore while, in the embodiment described above, it was determined whether or not the arcade game was being executed, and the power-feeding function was controlled on the basis of the result of this determination, this is not to be considered as being limitative. It would also be acceptable to determine whether or not the mobile game is being executed, and to control the power-feeding function on the basis of the result of this determination. In this case, it would be possible for the power-feeding device 36 not to be provided to the game machine 3. Yet further, it would be possible to determine whether or not the mobile game is being executed, for example, by the processing of the step S1 and of the step S3 of FIG. 6 being performed by the personal terminal device 4, and by the processing of the step 11 and of the step 14 being performed by a device to which the power-feeding device 36 is provided.

What is claimed is:

1. A game system that comprises a game machine having a game execution device that executes a first game and a power-feeding device that feeds a personal terminal device for an individual person that is connected thereto, the game machine and the personal terminal device being connected via a network, wherein the game system includes a computer, the computer functioning by executing a computer program as:

a first game execution determination device that determines whether or not the first game is being executed; and a power-feeding control device that controls a power-feeding function of the power-feeding device on the basis of a result of the determination by the first game execution determination device, wherein:

the game machine is capable of providing a service to a user of the personal terminal device of playing a second game upon the personal terminal device, the second game working together with the first game in such a way that progression of the second game is controlled by game data for the first game that is in progress on the game machine, the game data being received by the personal terminal device from the game machine, and the computer functions as the power-feeding control device that controls the power-feeding function of the power-feeding device so that the personal terminal device is fed on condition that the first game is being executed and that the second game is being executed working together with the first game.

2. The game system of claim 1, wherein:

the game execution device charges a playing fee to a user and permits the user to play the first game; and the first game execution determination device determines whether or not the first game is being executed on the basis of payment of the playing fee.

3. The game system of claim 1, wherein the power-feeding control device performs control so as to limit a time period of power-feeding by the power-feeding device, on the basis of the result of determination by the first game execution determination device.

4. A game control method for a game system that comprises a game machine having a game execution device that executes a first game and a power-feeding device that feeds a personal terminal device for an individual person that is connected thereto, the game machine and the personal terminal device being connected via a network, wherein the game system includes a computer, the computer functioning by executing a computer program as:

a first game execution determination device that determines whether or not the first game is being executed; and a power-feeding control device that controls a power-feeding function of the power-feeding device on the basis of a result of the determination by the first game execution determination device, wherein:

the game machine is capable of providing a service to a user of the personal terminal device of playing a second game upon the personal terminal device, the second game working together with the first game in such a way that progression of the second game is controlled by game data for the first game that is in progress on the game machine, the game data being received by the personal terminal device from the game machine, and the computer functions as the power-feeding control device that controls the power-feeding function of the power-feeding device so that the personal terminal device is fed on condition that the first game is being executed and that the second game is being executed working together with the first game.

* * * * *